US012764382B2

(12) United States Patent
Blake et al.

(10) Patent No.: US 12,764,382 B2
(45) Date of Patent: Oct. 13, 2026

(54) SYSTEM AND METHOD FOR DELIVERING MISSED PORTIONS OF MEDIA ASSETS TO INTERESTED VIEWERS

(71) Applicant: Adeia Guides Inc., San Jose, CA (US)

(72) Inventors: John Blake, Belmont, CA (US); Milan Patel, Santa Clara, CA (US); Rowena Young, Menlo Park, CA (US); Jean Michel Pierre Bourdon, Emerald Hills, CA (US)

(73) Assignee: ADEIA GUIDES INC., San Jose, CA (US)

( * ) Notice: Subject to any disclaimer, the term of this patent is extended or adjusted under 35 U.S.C. 154(b) by 34 days.

(21) Appl. No.: 19/032,813

(22) Filed: Jan. 21, 2025

(65) Prior Publication Data

US 2025/0175674 A1 May 29, 2025

Related U.S. Application Data

(63) Continuation of application No. 18/243,990, filed on Sep. 8, 2023, now Pat. No. 12,244,893, which is a (Continued)

(51) Int. Cl.

| | |
|---|---|
| ***H04N 21/433*** | (2011.01) |
| ***G06F 16/40*** | (2019.01) |
| ***G06F 16/48*** | (2019.01) |
| ***H04H 20/38*** | (2008.01) |
| ***H04H 60/56*** | (2008.01) |

(Continued)

(52) U.S. Cl.

CPC ........ *H04N 21/44218* (2013.01); *G06F 16/40* (2019.01); *G06F 16/48* (2019.01); *H04H 20/38* (2013.01); *H04H 60/56* (2013.01); *H04H 60/80* (2013.01); *H04N 21/23113* (2013.01); *H04N 21/252* (2013.01); *H04N 21/4126* (2013.01); *H04N 21/41265* (2020.08); *H04N 21/431* (2013.01); *H04N 21/4334* (2013.01); *H04N 21/4532* (2013.01); *H04N 21/458* (2013.01); *H04N 21/47217* (2013.01);

(Continued)

(58) Field of Classification Search

None

See application file for complete search history.

(56) References Cited

U.S. PATENT DOCUMENTS

| | | | | |
|---|---|---|---|---|
| 2004/0109668 A1* | 6/2004 | Stuckman | H04N 21/47217 | 386/295 |
| 2009/0113481 A1* | 4/2009 | Friedman | H04N 21/4532 | 725/46 |

(Continued)

*Primary Examiner* — Brian T Pendleton
*Assistant Examiner* — Jean D Saint Cyr
(74) *Attorney, Agent, or Firm* — HG LAW LLP

(57) ABSTRACT

Systems and methods are described herein for efficiently "catching-up" a user that is interested in a media asset when that user has missed a portion of the media asset while consuming the media asset together with other people. The system may detect that multiple people are consuming a media asset and may determine, based on a respective profile of each person, whether that person is interested in the media asset. When the system detects that the user is disregarding the media asset, the missed portion of the media asset is stored if the user is interested in the media asset, and is not stored if the user is not interested in the media asset.

20 Claims, 7 Drawing Sheets

Related U.S. Application Data continuation of application No. 17/572,821, filed on Jan. 11, 2022, now Pat. No. 11,792,478, which is a continuation of application No. 16/448,262, filed on Jun. 21, 2019, now Pat. No. 11,259,083, which is a continuation of application No. 15/200,634, filed on Jul. 1, 2016, now abandoned.

(60) Provisional application No. 62/334,202, filed on May 10, 2016.

(51) Int. Cl.

| | |
|---|---|
| ***H04H 60/80*** | (2008.01) |
| ***H04N 21/231*** | (2011.01) |
| ***H04N 21/234*** | (2011.01) |
| ***H04N 21/25*** | (2011.01) |
| ***H04N 21/41*** | (2011.01) |
| ***H04N 21/414*** | (2011.01) |
| ***H04N 21/422*** | (2011.01) |
| ***H04N 21/43*** | (2011.01) |
| ***H04N 21/431*** | (2011.01) |
| ***H04N 21/442*** | (2011.01) |
| ***H04N 21/45*** | (2011.01) |
| ***H04N 21/458*** | (2011.01) |
| ***H04N 21/472*** | (2011.01) |
| ***H04N 21/482*** | (2011.01) |
| ***H04N 21/83*** | (2011.01) |
| ***H04N 21/845*** | (2011.01) |

(52) U.S. Cl.

CPC ......... *H04N 21/4821* (2013.01); *H04N 21/83* (2013.01); *H04N 21/845* (2013.01)

(56) References Cited

U.S. PATENT DOCUMENTS

| | | | | |
|---|---|---|---|---|
| 2013/0047175 | A1* | 2/2013 | Ramirez Flores . | H04N 21/4223<br>725/12 |
| 2014/0331242 | A1* | 11/2014 | De La Garza ... | H04N 21/44218<br>725/12 |
| 2017/0201779 | A1* | 7/2017 | Publicover ......... | G06Q 30/0269 |

* cited by examiner

SYSTEM AND METHOD FOR DELIVERING MISSED PORTIONS OF MEDIA ASSETS TO INTERESTED VIEWERS

CROSS-REFERENCE TO RELATED APPLICATIONS

This application is a continuation of U.S. patent application Ser. No. 18/243,990, filed Sep. 8, 2023, which is a continuation of U.S. patent application Ser. No. 17/572,821, filed Jan. 11, 2022, now U.S. Pat. No. 11,792,478, which is a continuation of U.S. patent application Ser. No. 16/448,262, filed Jun. 21, 2019, now U.S. Pat. No. 11,259,083, which is a continuation of U.S. patent application Ser. No. 15/200,634, filed Jul. 1, 2016, which claims the benefit of U.S. Provisional Application No. 62/334,202, filed May 10, 2016, the disclosure of which are hereby incorporated by reference herein in their entireties.

BACKGROUND

People often get together to consume content together (e.g., watch sporting events or a movie). While consuming content, a person may become distracted by, for example, a phone call or a text message, or may leave the room for a short time period. When a person gets distracted, that person may miss part of the content that is being consumed. Traditional systems deal with this situation by recording and storing a latest portion of the content being viewed (e.g., the last shown 30 minutes of a movie that is playing). When the person who left the room comes back, that person is able to "catch up" by rewinding the movie until a point when he or she became distracted and then missed watching the missed portion. However, those systems store or record the missed portions without regard to whether the person who is disregarding the media asset is likely to want to consume that missed portion.

Thus, traditional systems are inefficient and ineffective at least because they indiscriminately record or store content without regard as to whether that content is likely to be consumed, thereby wasting resources (e.g., tuner time to record the content and storage space to store it). Moreover, as the person who missed a portion of the media asset is "catching up" to the current time, other viewers are forced to consume the same portion of the content again.

SUMMARY

Therefore, systems and methods are described herein for efficiently "catching up" a user who is interested in a media asset when that user has missed a portion of the media asset while consuming the media asset together with other people. Specifically, the system detects that more than one person is consuming a media asset and determines, based on a respective profile of each person, whether that person is likely to be interested in the media asset. Those users who are interested in the media asset are placed in one group and those users who are not are placed in another group. When the system detects that one of the users is disregarding the media asset, the system determines whether the user is interested in the media asset based on which group the user was placed into. If the user is interested in the media asset, the system stores the missed portion of the media asset, and if the user is not interested in the media asset, the system refrains from storing that portion of the media asset.

In some aspects, a media guidance application may be configured for effective utilization of resources by restricting initialization of a catch-up mechanism to users who are interested in a media asset. The media guidance application may detect that a plurality of users are consuming a media asset from the same user equipment. For example, several couples may get together to watch a particular movie.

The media guidance application may determine, for each respective user of the plurality of users, whether a respective user is interested in the media asset. In order to make that determination, the media guidance application may compare data of a respective profile of the respective user to metadata of the media asset. In response to determining that the data of the respective profile matches the metadata of the media asset, the media guidance application may determine that the respective user is interested in the media asset. In response to determining that the data of the respective profile does not match the metadata of the media asset, the media guidance application may determine that the respective user is not interested in the media asset.

For example, if several couples get together to watch a romance movie, as can be determined from metadata associated with the movie, the media guidance application may determine that some of the people are interested in the movie while others are not by comparing a profile of each user to the metadata of the movie. If a profile of a specific user matches a genre of romance, then the media guidance application may determine that the user is interested in the media asset. If a profile of a specific user does not match the genre of romance then the media guidance application may determine that the user is not interested in the media asset. In some embodiments, the media guidance application may determine that the data of the respective profile matches the metadata associated with the media asset by comparing keywords within the profile to keywords in the metadata. For example, if the user's profile includes a name of an actress that the user likes or a genre of a program that the user enjoys, the media guidance application may search for those keywords in the metadata associated with the media asset to determine a match. If the media guidance application finds one or more keywords as a result of the search, the media guidance application may determine that the data of the respective profiles matches the metadata associated with the media asset.

The media guidance application may identify a first subset of the plurality of users that includes each respective user who is interested in the media asset and also identify a second subset of the plurality of users that includes each respective user who is not interested in the media asset. For example, the media guidance application may place the people who are interested in romance into one group and people who are not interested in romance into another. It should be noted that the media guidance application may determine that one user is interested in a media asset because that user enjoys a certain genre (e.g., romance), while another user may be determined to be interested in the media asset because the user likes a certain actor who is featured in the media asset. Thus, users can be determined to be interested in a media asset based on different categories (e.g., genre, actor, director, etc.).

The media guidance application may detect that a user of the plurality of users is disregarding the media asset. For example, the media guidance application may utilize a camera to track each user and detect when a user started disregarding the media asset. For example, the media guidance application may detect that the user is using a smart phone, is talking to another person, or has left the room. Additionally or alternatively, the media guidance application may detect that a user is disregarding the media asset by simply detecting that the user is no longer looking in the direction of the device that is playing the media asset.

The media guidance application may determine whether the user is identified in the first subset or in the second subset. In response to determining that the user is identified in the first subset, the media guidance application may store a portion of the media asset starting at a time when the user started disregarding the media asset. In response to determining that the user is in the second subset, the media guidance application may refrain from storing the portion of the media asset starting at the time when the user started disregarding the media asset.

To continue with the example above, the media guidance application may determine whether the user who is disregarding the romance movie is in the group of people who are interested in romance movies or in the group of people who are not interested in romance movies. If the media guidance application determines that the user who is disregarding the media asset is in the group of people who are interested in romance movies, the media guidance application may begin recording the romance movie from the time when the user started disregarding the media asset. If the media guidance application determines that the user who is disregarding the romance movie is in the group of people who are not interested in the media asset, the media guidance application may not start recording the romance movie.

In some embodiments, it may be useful to transmit the stored portion of the media asset to a device associated with the user who is disregarding the media asset so that the user is able to "catch up" without forcing the other people who are consuming the media asset to have to watch a part of the media asset again. Thus, the media guidance application may, when storing the portion of the media asset starting at the time when the user started disregarding the media asset, detect a plurality of accessible user equipment, each corresponding to a respective user. The media guidance application may identify a user equipment of the plurality of user equipment that is associated with the user who is disregarding the media asset, and transmit the portion of the media asset to the identified user equipment.

For example, each user who is watching the romance movie, as described above, may have an associated smart phone. The media guidance application may detect those smart phones and identify which of the smart phones is associated with the user who is disregarding the media asset. The media guidance application may transmit the stored portion of the romance movie to the identified smart phone. It should be noted that the media guidance application may transmit the stored portion as it is being transmitted to the other users. Alternatively or additionally, the media guidance application may transmit the stored portion of the media asset after it has been fully recorded or stored on the user equipment that is presenting the media asset to the user.

In some embodiments, it may be useful to record the full media asset if the device associated with the user (e.g., the user's smart phone) where the stored portion is to be transmitted to is not able to play back the type of media that is associated with the media asset. Thus, the media guidance application may determine whether the identified user equipment is not able to play the type of media associated with the media asset. In response to determining that the identified user equipment is not able to play the type of media associated with the media asset, the media guidance application may identify, based on the user's profile, another user equipment associated with the user that is able to record the media asset, and schedule, on the identified user equipment, the media asset for recording.

For example, the media guidance application may determine that the portion of the media asset is in a high-definition format, but the user's smart phone is not able to play media in a high definition format. Therefore, the media guidance application may determine, based on the user's profile, that a DVR is associated with the user (e.g., a DVR that is located in the user's home). The media guidance application may instruct the DVR to search for the media asset within its program listings (e.g., broadcast program listings) and record the media asset. Additionally or alternatively, the media guidance application may determine that the media asset is available on demand and prompt the user, when the user is consuming media from the DVR, as to whether the user would like to consume the media asset.

It should be noted that the media guidance application, when the user attempts to consume the media asset recorded on the DVR, as described above, may present an option to the user to start the media asset from a point in time, within the media asset, when the user started disregarding the media asset. Additionally or alternatively, the media guidance application may present an option to the user to watch only the portion of the media asset that was playing while the user was disregarding the media asset.

In some embodiments, it may be useful to record the media asset for later viewing in spite of determining that the user is not interested in the media asset, for example, if the user wants to consume the media asset so the user is able to discuss the media asset with his or her friends. Therefore, the media guidance application may, in response to determining that the user is in the second subset, detect a plurality of accessible user equipment, identify a user equipment of the plurality of user equipment that is associated with the user who is disregarding the media asset, and generate for display a prompt on the identified user equipment to schedule the media asset for recording. As described above, the media guidance application may determine that the user is not interested in the movie. However, the media guidance application may detect that a number of users have associated smart phones. The media guidance application may identify the user's smart phone and generate for display an option to schedule the media asset for recording, for example, on a DVR associated with the user. The user may, of course, reject the option if the user does not want to consume the media asset later.

In some embodiments, it may be useful to not detect that the user is disregarding the media asset under certain circumstances. The media guidance application may detect that the user of the plurality of users is disregarding the media asset by detecting that the user's eyes are not turned in the direction of the media asset. The media guidance application may activate a timer that tracks a period of time that the user's eyes are not turned in the direction of the media asset, and determine, based on the timer, that the period of time for which the user's eyes are not turned in the direction of the media asset is greater than a threshold. In response to determining, based on the timer, that the period of time for which the user's eyes are not turned in the direction of the media asset is greater than the threshold, the media guidance application may detect that the user is disregarding the media asset.

For example, it may not be useful to detect that a user is disregarding the media asset in instances when a user was distracted for a short amount of time (e.g., 5 seconds). Thus, the media guidance application may only detect that the user is disregarding the media asset when the user has turned away from the media asset for longer than a threshold time. The media guidance application may determine the threshold based on how the user is disregarding the media asset. For example, the threshold may be different for when the user leaves the room versus for when the user is using his smart phone.

In some embodiments, it may not be useful to store the portion of the media asset because the user has not missed anything important or the user has not been disregarding the media asset for a significant amount of time. The media guidance application may, when storing the portion of the media asset starting at a time when the user started disregarding the media asset, detect that the user is no longer disregarding the media asset, and determine whether the user was disregarding the media asset for a time period that is less than a threshold time period. In response to determining that the user was disregarding the media asset for the time period that is less than the threshold time period, the media guidance application may delete the stored portion of the media asset. In some embodiments, it may not be useful to store the portion of the media asset if that portion is an advertisement. Thus, the media guidance application may determine whether the portion of the media asset is an advertisement and if so, refrain from storing the portion.

For example, the media guidance application may determine that the user stopped disregarding the media asset after about 5 seconds because the user looked at her smart phone. The media guidance application may determine that the user was disregarding the media asset for less than a threshold time period. The threshold may be determined based on a time length or the threshold may be based on whether an important event in the media asset occurred or started to occur while the user was disregarding the media asset. The media guidance application may determine an existence of an important event based on metadata associated with the media asset or based on a scene recognition algorithm. If the threshold is not met, the media guidance application may delete the stored portion of the media asset.

In some embodiments, it may be useful to have the user make the determination as to whether to delete the stored portion of the media asset. The media guidance application may, in response to determining that the user was disregarding the media asset for the time period that is greater than the threshold time period, prompt the user as to whether to delete the portion of the media asset. For example, if the threshold is 30 seconds and the user has been disregarding the media asset for 45 seconds, the media guidance application may give the user the option whether to delete the portion of the media asset. In some embodiments, the media guidance application may generate for display an option to consume the portion of the media asset. It should be noted that the option may be generated for display in addition to or instead of prompting the user as to whether to delete the portion of the media asset.

In some embodiments, the media guidance application may prompt the user as to whether to delete the portion of the media asset at a mobile user equipment associated with the user. As described above, in connection with identifying a device associated with the user, the media guidance application may identify, for example, a smart phone associated with the user and prompt the user at that device.

In some embodiments, it may be useful to play back the stored portion of the media asset at an increased speed so that the user may "catch up" to the current time in the media asset more quickly. The media guidance application may determine that the media asset is an audio-visual media asset and that the portion of the media asset does not contain dialogue.

In response to determining that the portion of the media asset does not contain dialogue, the media guidance application may generate for display the video of the portion of the media asset at an increased speed. For example, if there is no dialogue in a movie, the user may "catch up" to the video portion at an increased speed, as the user would not need to hear what is said.

DETAILED DESCRIPTION

Figure 1:
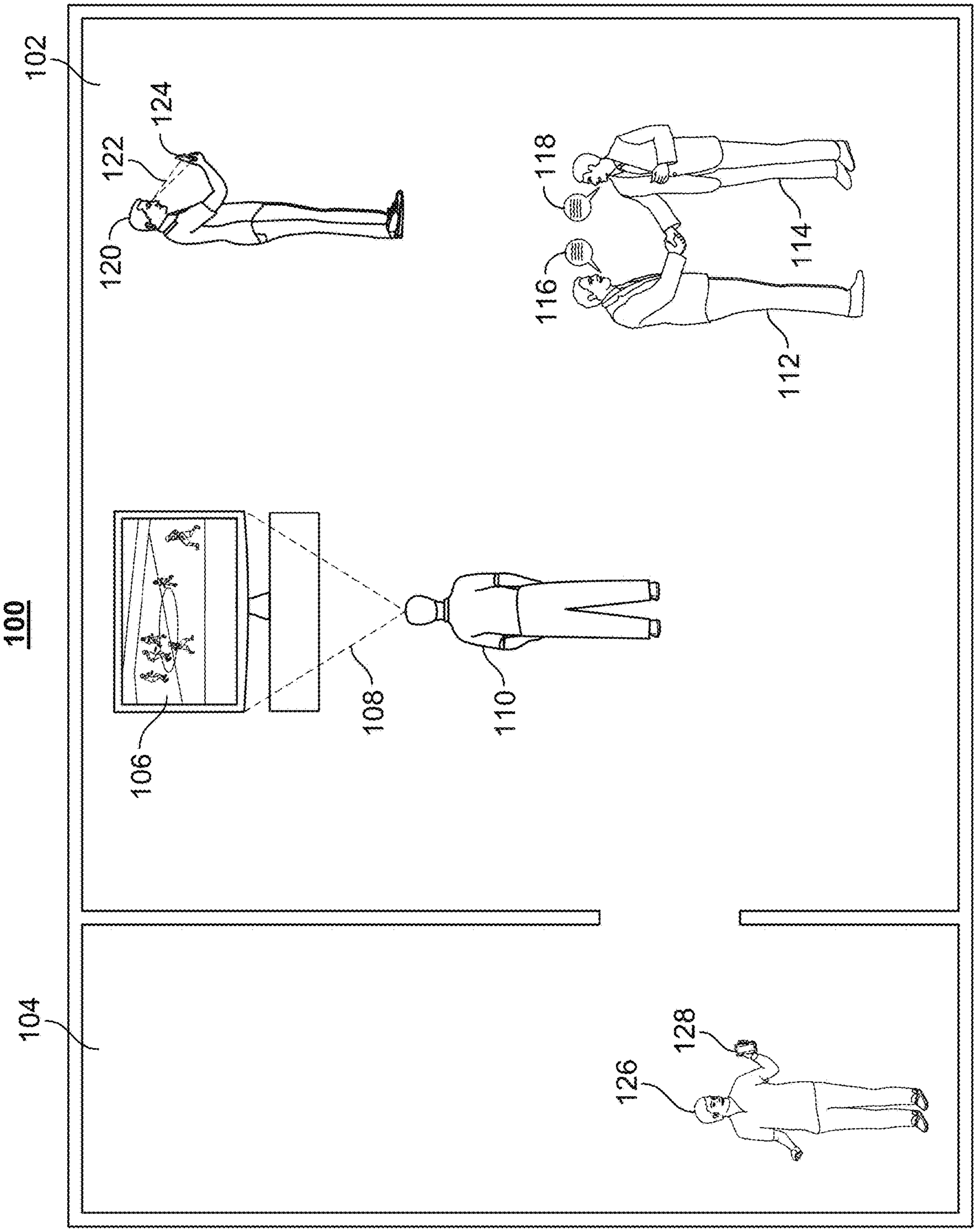
FIG. 1 shows an illustration of how different users may be disregarding the media asset, in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

As referred to herein, the term "in response to" refers to initiated as a result of. For example, a first action being performed in response to a second action may include interstitial steps between the first action and the second action.

As referred to herein, the term "directly in response to" refers to caused by. For example, a first action being performed directly in response to a second action may not include interstitial steps between the first action and the second action.

Systems and methods are described herein for efficiently "catching up" a user who is interested in a media asset when that user has missed a portion of the media asset while consuming the media asset together with other people. It should be noted that these systems and methods will be described in a context of a media guidance application. However, a person skilled in the art will understand that these systems and methods may be implemented independently of a media guidance application.

The media guidance application may detect that more than one person is consuming a media asset and may determine, based on a respective profile of each person, whether a particular person is interested in the media asset. Those users who are interested in the media asset may be placed into one group and those users who are not may be placed into another group. When the media guidance application detects that one of the users is disregarding the media asset, the media guidance application may determine whether the user is interested in the media asset based on which group the user was placed into. If the media guidance application determines that the user is interested in the media asset, the media guidance application may store the missed portion of the media asset, and if the media guidance application determines that the user is not interested in the media asset, the media guidance application may refrain from storing that portion of the media asset.

FIG. 1 shows an illustration of a display screen representing how different users may be disregarding the media asset. Building 100 is depicted as having two rooms, large room 102 and small room 104. Large room 102 is depicted as having user equipment 106 within visual field 108 of user 110. User 120 is depicted using mobile device 124 within visual field 122 of user 120. User 112 is depicted having a conversation with user 114 with element 116, depicted as a speech bubble, corresponding to user 112, and element 118 corresponding to user 114, depicted as a speech bubble. User 126 is depicted in small room 104, away from user equipment 106. User 126 is depicted holding phone 128.

User equipment 106 may include control circuitry (e.g., control circuitry 504, discussed further below with reference to FIGS. 3-6) that executes a media guidance application. The media guidance application may include a mechanism for efficiently catching up users by restricting initialization of a catch-up mechanism to users who are interested in a media asset. As referred to herein, the term catching up refers to executing a mechanism to play back to a user a portion of the media asset that the user has missed. User equipment 106 may have all the same capabilities of user television equipment 602, user computer equipment 604, and wireless user communications device 606 described in relation to FIG. 6 below.

In some embodiments, the media guidance application may detect that a plurality of users are consuming a media asset from the same user equipment (e.g., user equipment 106). For example, the media guidance application may be implemented on a device (e.g., a set-top box) that includes a camera or another suitable user input interface as described in later detail below. Alternatively or additionally, a camera may be associated with a set-top box (e.g., connected via a USB port or via a wireless protocol such as Wifi or Bluetooth). The camera may record images of the room 102. The media guidance application may receive the images and perform image pattern recognition on the images. Based on the results of the pattern recognition, the media guidance application may determine how many people are in the room. The media guidance application may instruct the camera to continue recording the room and attempt to identify each user based on the user's facial features (e.g., through a facial recognition algorithm).

It should be noted that other methods of detecting users who are consuming a media asset may be used. For example, the media guidance application may require each user to log in to the system by, for example, entering a password or via thumbprint identification. Furthermore, the media guidance application may transmit the images to a remote server in order to detect that a plurality of users are in the room. The remote server may be located outside the user's home (e.g., at media guidance data source 618 or media guidance content source 616).

The media guidance application may determine, for each respective user of the plurality of users, whether a respective user is interested in the media asset. The media guidance application may make the determination by comparing data of a respective profile of the respective user to metadata of the media asset and, in response to determining that the data of the respective profile matches the metadata of the media asset, determining that the respective user is interested in the media asset. The media guidance application may, in response to determining that the data of the respective profile does not match the metadata of the media asset, determine that the respective user is not interested in the media asset.

For example, the media guidance application may retrieve a profile associated with users 110, 112, 114, and 126. The media guidance application may also retrieve metadata associated with the media asset being generated for display by user equipment 106. For example, the media guidance application may determine, based on the metadata, that the media asset has an associated genre of comedy. The media guidance application may then compare the genre of comedy to data in each profile associated with users 110, 112, 114, and 126 to determine whether each user likes comedy. The user profile may include a listing of all genres and a scaled value (e.g., one to ten) indicating how strongly each user prefers a specific genre. Thus, if the media guidance application determines, based on the user's profile, that comedy is associated with a value of 9, the media guidance application may determine that the user is interested in comedies. If the media guidance application determines, based on the user's profile, that comedy is associated with a value of 2, the media guidance application may determine that the user is not interested in comedies.

In some embodiments, the media guidance application may determine whether a specific user is interested in comedies based on the media assets that the user has consumed as indicated by the user's profile. Thus, if the media guidance application determines that the user consumed a large number of comedies in comparison with other genres, the media guidance application may determine that the user is interested in comedies. Using either of these methods, or a combination of both, the media guidance application may, for example, determine that users 110, 120, and 126 are interested in the media asset while users 112 and 114 are not interested in the media asset.

The media guidance application may identify a first subset of the plurality of users including each respective user who is interested in the media asset and identify a second subset of the plurality of users including each respective user who is not interested in the media asset. For example, the media guidance application may place users interested in the media asset (e.g., users 110, 120, and 126, as determined from the example above) in one group and users who are not interested in the media asset (e.g., users 112 and 114, as determined from the example above).

The media guidance application may detect that a user of the plurality of users is disregarding the media asset. For example, the media guidance application may detect that user 120 is no longer looking in the direction of the media asset by determining (e.g., by using a camera, as described above) that the media asset is not in the user's visual field (e.g., user's visual field may be user's visual field 122). Additionally or alternatively, the media guidance application may detect that smart phone 124 is in user's visual field 122. Based on one or both of these determinations, the media guidance application may detect that the user is disregarding the media asset.

The media guidance application may also detect via use of a microphone that users 112 and 114 are speaking as indicated by elements 116 and 118. The device that implements the media guidance application may include a microphone or a microphone may be connected to such a device (e.g., via a USB port, or through Wifi or Bluetooth protocols). Based on the detection of speech, the media guidance application may determine that users 112 and 114 are disregarding the media asset. In some embodiments, the media guidance application may use a combination of a camera and a microphone to determine that users 112 and 114 are speaking to each other. For example, if the media guidance application detects, through a camera, that users 112 and 114 are facing each other and through a microphone that both are talking, the media guidance application may determine that both users are disregarding the media asset. The media guidance application may also determine that a user is disregarding the media asset if the user is no longer in the room. For example, the media guidance application may detect that user 126 may have left the room to talk on phone 128.

The media guidance application may determine whether the user is identified in the first subset or in the second subset. For example, the media guidance application may perform a look-up of one group that includes all users who are interested in the media asset and the other group that includes all users who are not interested in the media asset. For example, as described above, if the media guidance application determines that user 120 is disregarding the media asset, the media guidance application may determine that user 120 is in a subset of users who are interested in the media asset. However, if the media guidance application determines that user 112 is disregarding the media asset, the media guidance application may determine that user 112 is in a subset of users who are not interested in the media asset.

In response to determining that the user is identified in the first subset, the media guidance application may store a portion of the media asset starting at a time when the user started disregarding the media asset. For example, if the media guidance application determines user 120 is disregarding the media asset, the media guidance application may start recording the media asset from the point in time when the media guidance application detected that the user started disregarding the media asset.

In response to determining that the user is in the second subset, the media guidance application may refrain from storing the portion of the media asset starting at the time when the user started disregarding the media asset. For example, if the media guidance application determines that user 112 is disregarding the media asset, the media guidance application may not start recording the media asset and instead no action is taken.

In some embodiments, the media guidance application may store the portion of the media asset at a device associated with the user that is disregarding the media asset (e.g., a smart phone associated with the user). This may be especially useful for enabling the user to catch up without forcing other users to review the same portion of the media asset that they have already consumed. The media guidance application may, when storing the portion of the media asset starting at the time when the user started disregarding the media asset, detect a plurality of accessible user equipment, each corresponding to a respective user, identify a user equipment of the plurality of user equipment that is associated with the user who is disregarding the media asset, and transmit the portion of the media asset to the identified user equipment.

For example, the media guidance application may be residing on a device that includes or can access other devices through a wireless connection or multiple wireless connections (e.g., through a Wifi Protocol or Bluetooth protocol). The media guidance application may scan for other devices that are able to wirelessly communicate with the device where the media guidance application is playing the media asset. The media guidance application may detect all the devices that are within range and identify the device that is associated with the user who is disregarding the media asset by, for example, comparing an identification associated with each device that the media guidance application detects with device identification of devices stored in the user's profile. If one of the identifications matches with a device identification in the user's profile, the media guidance application may identify the device that is associated with the user who is disregarding the media asset. The media guidance application may transmit the stored portion of the media asset via the same wireless connection to the identified device.

In some embodiments, the media guidance application may determine the best connection for transmitting the stored portion of the media asset, if multiple connections are available between the identified device and the device from where the media guidance application is playing the media asset. For example, if two connections are available (e.g., Wifi and Bluetooth), the media guidance application may choose the faster one or the less utilized one. The media guidance application may execute a test of a connection prior to transmitting the stored media asset.

In some embodiments, the media guidance application may determine whether the identified device is able to play the media asset and if not, the media guidance application may record the media asset on another device. The media guidance application may determine whether the identified user equipment is able to play a type of media associated with the media asset. For example, the media guidance application may query the identified device for a list of formats that the device supports, and, based on the list, determine whether the identified device is able to play the media asset. In response to determining that the identified user equipment is not able to play the type of media associated with the media asset, the media guidance application may take the following actions.

The media guidance application may identify, based on the user's profile, another user equipment associated with the user that is able to record the media asset, and schedule, on the identified another user equipment, the media asset for recording. For example, the media guidance application may retrieve from the profile associated with the user who is disregarding the media asset, a list of devices associated with that user. The media guidance application may query those devices to determine which device is able to record the media asset. For example, one of the devices may be a set-top box which is able to record the media asset. The media guidance application may schedule on the identified another user equipment, the media asset for recording. For example, the media guidance application may schedule a recording for the media asset on the identified set-top box.

In some embodiments, it may be desirable to record the media asset that the user is disregarding in spite of detecting that the user is not interested in the media asset, for example, because the user may want to consume the media asset to discuss it with his friends. The media guidance application may, in response to determining that the user is in the second subset, detect a plurality of accessible user equipment, identify a user equipment of the plurality of user equipment that associated with the user who is disregarding the media asset, and generate for display a prompt on the identified user equipment to schedule the media asset for recording.

For example, the media guidance application may detect accessible devices in range in the same manner described above (e.g., by connecting to these devices through a wireless connection). The media guidance application may then, as described above, compare the device identification associated with each detected device with devices in the user's profile and transmit a message to the user's device to prompt the user to record the media asset.

It may be useful to refrain from determining that a user is disregarding the media asset if the user gets distracted for a short period of time as the user has likely not missed anything important. The media guidance application may, when detecting that the user of the plurality of users is disregarding the media asset, detect that the user's eyes are not turned in the direction of the media asset, activate a timer that tracks a period of time that the user's eyes are not turned in the direction of the media asset and determine, based on the timer, that the period of time for which the user's eyes are not turned in the direction of the media asset is greater than a threshold. In response to determining, based on the time, that the period of time for which the user's eyes are not turned in the direction of the media asset is greater than the threshold, the media guidance application may detect that the user is disregarding the media asset For example, the media guidance application may track all the users with a camera (as described above). Based on the images received from the camera, the media guidance application may determine that a user has turned away from the media asset. The media guidance application may start a timer that will track how long the user is turned away from the media asset. When a threshold amount of time passes and the user is still turned away from the media asset, the media guidance application may determine that the user is disregarding the media asset. It should be noted that the media guidance application may start storing the portion of the media asset as soon as the user turns away from the media asset and may delete any stored portion if the threshold is not met.

In some embodiments, it may be useful to store portions of a media asset that are longer than a threshold length. Thus, the media guidance application may detect that the user is no longer disregarding the media asset and determine whether the user was disregarding the media asset for a time period that is less than a threshold time period. In response to determining that the user was disregarding the media asset for the time period that is less than the threshold time period, the media guidance application may delete the stored portion of the media asset.

For example, the media guidance application may be tracking the user's eyes and detect that the user has turned back to the media asset. The media guidance application may have been tracking an amount of time that the user has been disregarding the media asset (e.g., using a timer). The media guidance application may retrieve a threshold value from memory and compare to the timer. If the timer is showing an amount of time that is less than the threshold, the media guidance application may delete the stored portion of the media asset.

In some embodiments, in response to determining that the user was disregarding the media asset for the time period that is greater than the threshold time period, the media guidance application may prompt the user as to whether to delete the portion of the media asset. For example, it may be useful to give a user a choice whether to delete the stored portion of the media asset allowing more flexibility in the system. In some embodiments, the media guidance application may generate for display an option to consume the portion of the media asset. For example, the media guidance application may generate an option to view a part of a movie that the user missed while talking on the phone. In some embodiments, the media guidance application may prompt a user at a mobile user equipment associated with the user. For example, the media guidance application may generate for display a prompt on a smart phone associated with the user.

Figure 2:
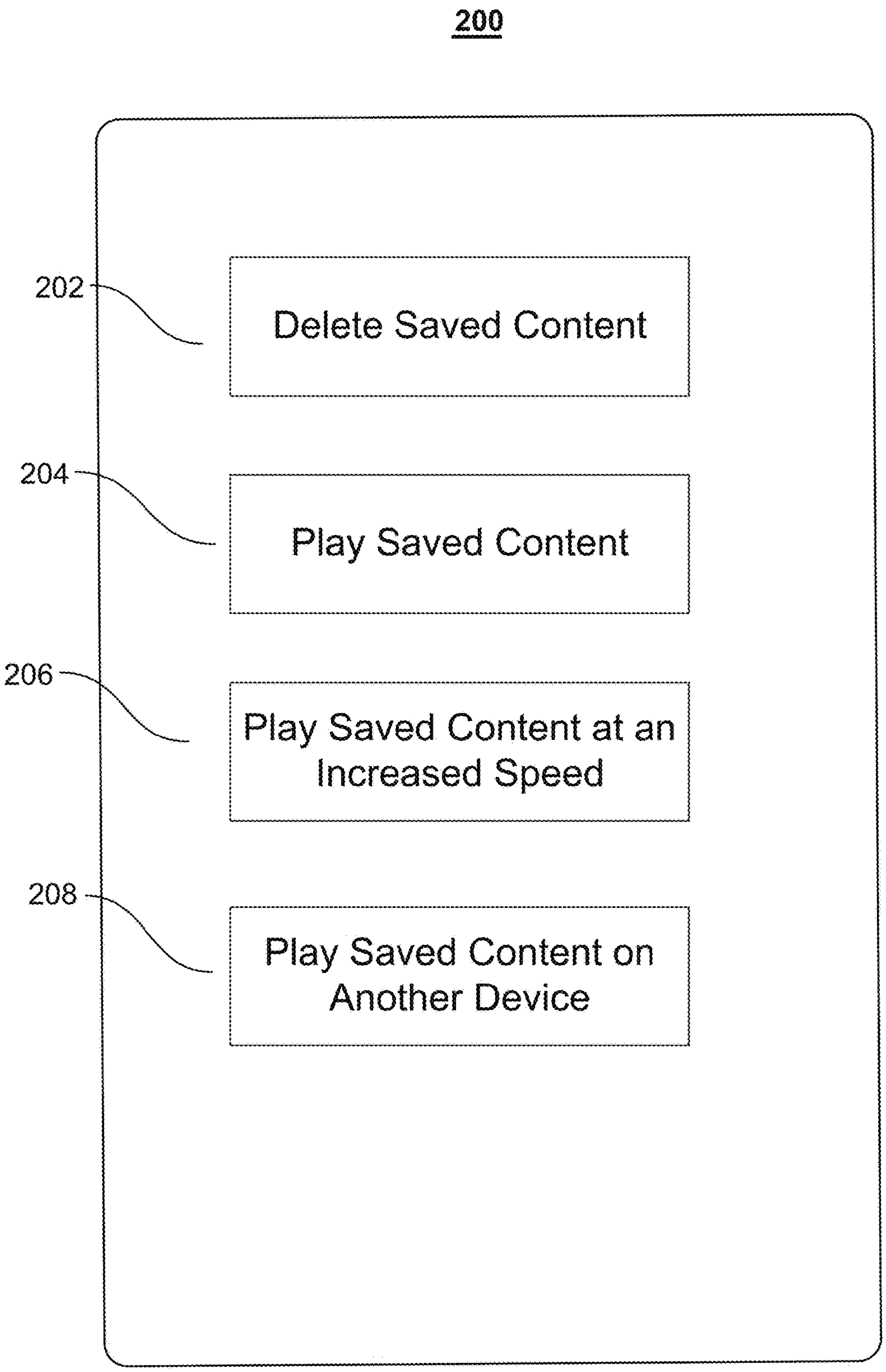
FIG. 2 shows an illustrative embodiment of a display screen showing different options for the user related to the stored portion of the media content, in accordance with some embodiments of the disclosure.

Screen 200 of FIG. 2 shows an illustrative embodiment of a display screen showing different options for the user related to the stored portion of the media content. User-selectable option 202 enables the user to delete the recorded portion of the media asset. When the media guidance application receives a user-selection of option 202, the media guidance application may delete the saved portion of the media asset if the media asset is stored locally on the depicted device. However, if the missed portion of the media asset is stored on another device, the media guidance application on the depicted device may transmit a delete command to the device where the portion of the media asset is stored.

User-selectable option 204 enables the user to play the saved portion of the media asset. It should be noted that the media guidance application may play the stored portion if the stored portion is stored on the device depicted or stream the stored portion from another device (e.g., the device that is playing the media asset for the plurality of users). In some embodiments, the media guidance application may disable option 204 until the stored portion of the media asset has been downloaded to the depicted device.

User-selectable option 206 enables a user to play saved content at an increased speed. This may be useful when the media content is audio-visual and doesn't have any dialogue. This way the user can have almost a digest of the video without missing any important conversations within the media asset. The media guidance application may determine that the media asset is an audio-visual media asset. For example, the media guidance application may make that determination based on the format of the media asset. The media guidance application may determine that the portion of the media asset does not contain dialogue. The media guidance application may perform this determination by using audio recognition algorithms to detect whether characters are speaking. In response to determining that the portion of the media asset does not contain dialogue, the media guidance application may generate for display the video of the portion of the media asset at an increased speed.

User-selectable option 208 enables the user to play the portion of the media asset on another device. For example, as discussed above, the media guidance application may detect all devices accessible to the user, in the user's vicinity (e.g., all devices that can be accessed via a wireless network (e.g., Wifi, Bluetooth). The media guidance application may then bring up a list to the user to select a device whether the user prefers that the portion of the media asset be played. Upon the selection of the device, the media guidance application may play the missed portion of the media asset on that device.

Figure 3:
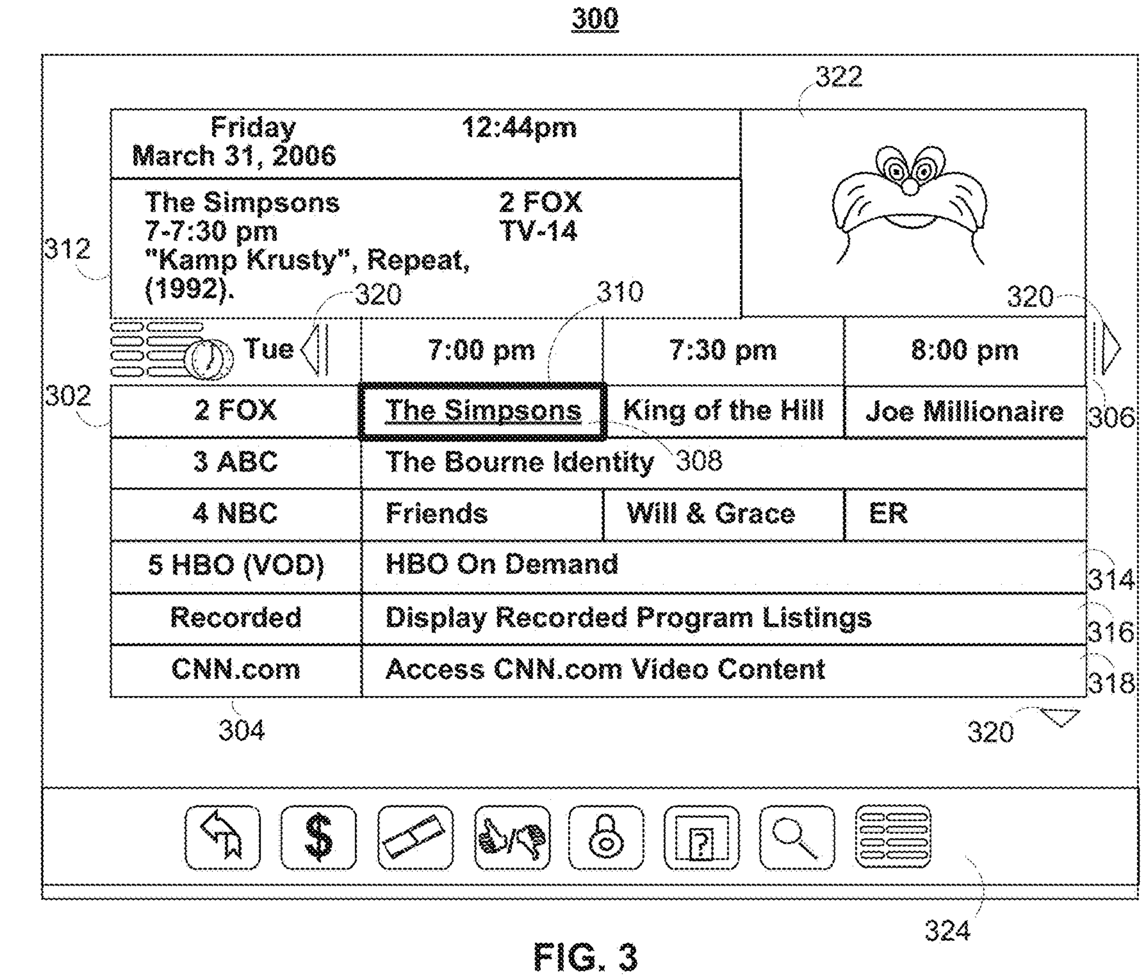
FIG. 3 shows an illustrative embodiment of a display screen that may be used to provide media guidance application listings and other media guidance information, in accordance with some embodiments of the disclosure.
Figure 4:
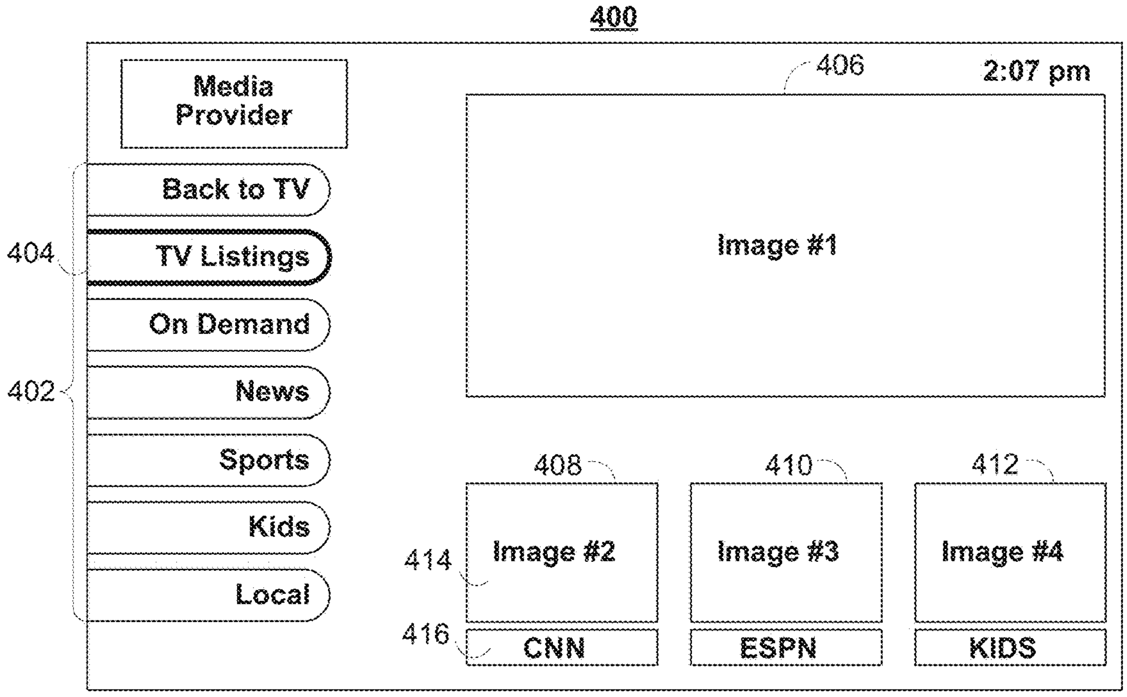
FIG. 4 shows another illustrative embodiment of a display screen that may be used to provide media guidance application listings, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e. g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www. allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7, 165, 098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
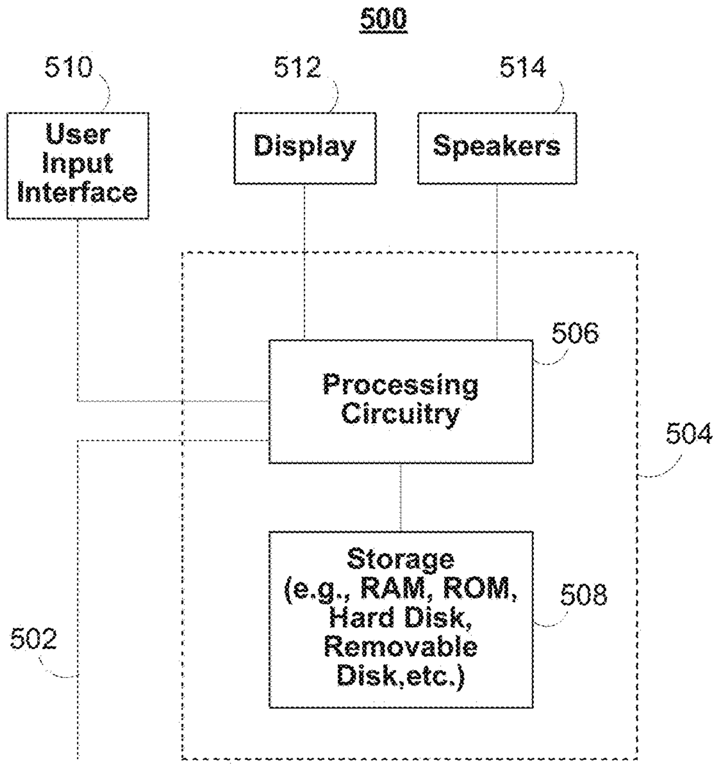
FIG. 5 is a block diagram of an illustrative device, in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
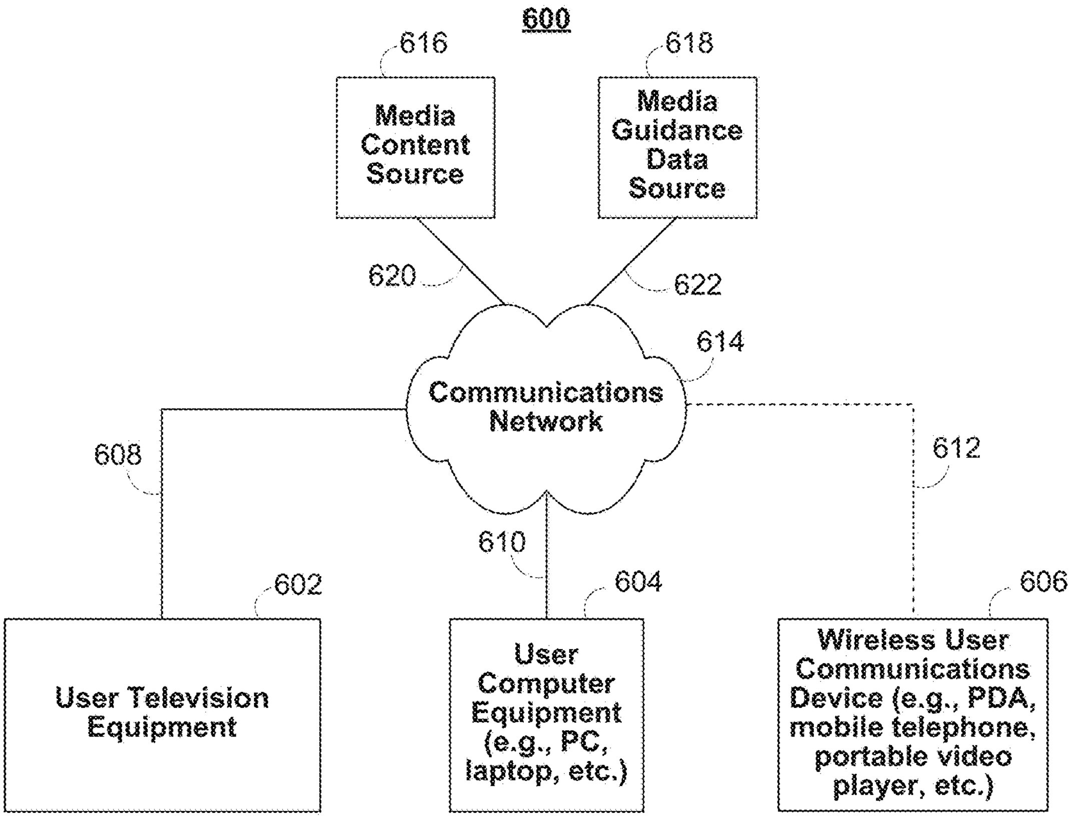
FIG. 6 is a block diagram of an illustrative media system, in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www. allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612.

Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761, 892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

Figure 7:
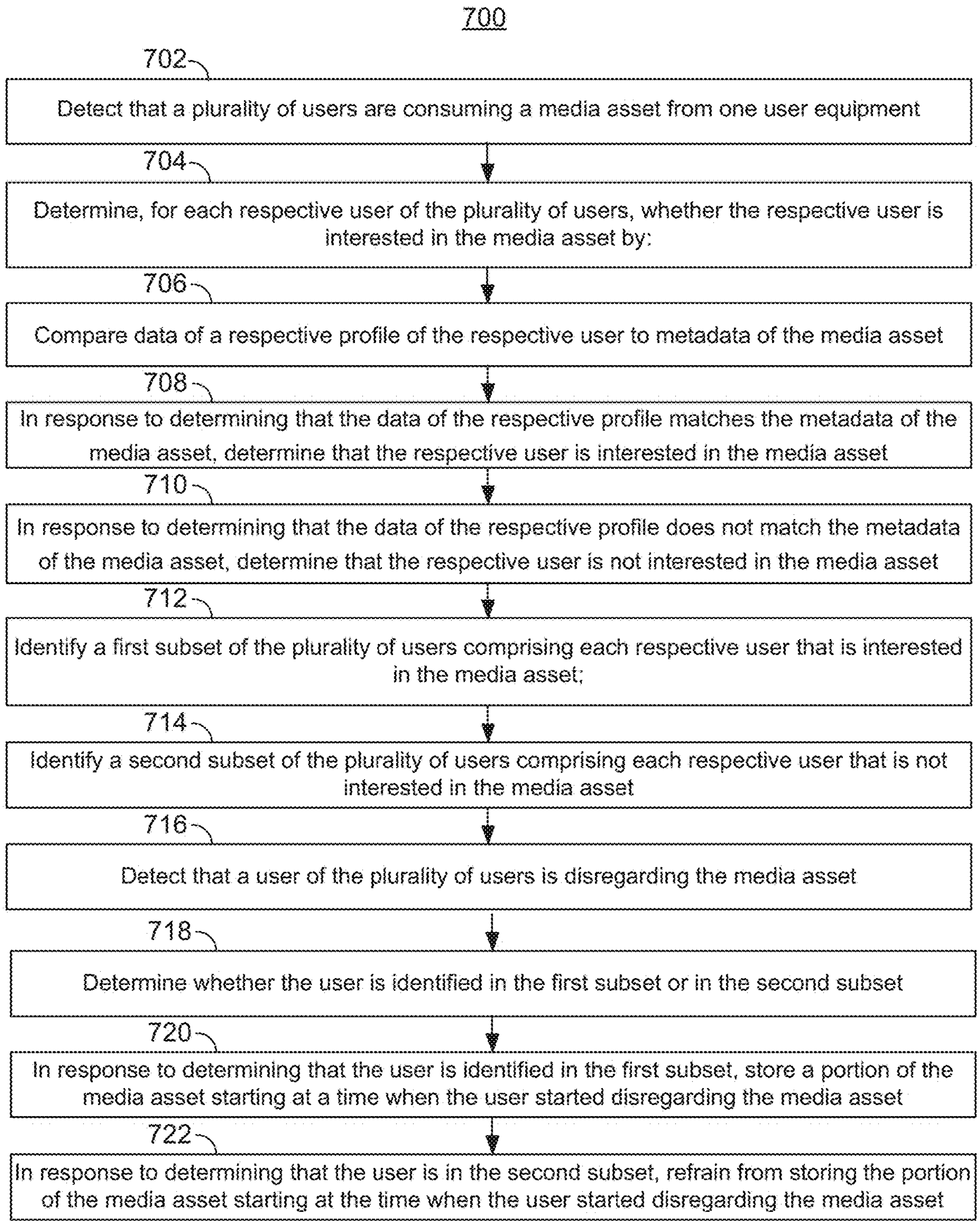
FIG. 7 depicts an illustrative process that may be used to efficiently provide a "catch-up" mechanism to a viewer of a media asset, in accordance with some embodiments of this disclosure.

FIG. 7 depicts an illustrative process 700 that may be used to efficiently provide a catch-up mechanism to a viewer of a media asset. At 702, the media guidance application detects (e.g., via control circuitry 504, as discussed with reference to FIGS. 3-6) that a plurality of users are consuming a media asset from one user equipment. The media guidance application may perform the detection using methods similar to those described in relation to FIG. 1. For example, the media guidance application may be implemented on one of devices 602, 604, and 606. The device may have access to a camera. The camera may be built into the device or connected to it (e.g., via a wired connection such as USB or a wireless connection such Wifi or Bluetooth). The media guidance application may use an edge detection algorithm to determine how many users are in a room and track them as they move around the room. The media guidance application may make the determination locally or transmit the images to another device for processing. The device may be located at the user's home or remotely (e.g. at media content source 616 or media guidance data source 618). This device may be reachable via communications network 614.

At 704, the media guidance application determines (e.g., via control circuitry 504, as discussed with reference to FIGS. 3-6), for each respective user of the plurality of users, whether a respective user is interested in the media asset. The media guidance application makes this determination by steps 706 and 708. At 706, the media guidance application compares (e.g., via control circuitry 504, as discussed with reference to FIGS. 3-6) data of a respective profile of the respective user to metadata of the media asset. The media guidance application may perform the detection using methods similar to those described in relation to FIG. 1. For example, the user's profile may include a list of keywords that represent the user's interests in media. The media guidance application may compare those keywords to the metadata of the media asset to determine if matches exist.

At 708, in response to determining that the data of the respective profile matches the metadata of the media asset, the media guidance application determines (e.g., via control circuitry 504, as discussed with reference to FIGS. 3-6) that the respective user is interested in the media asset. At 710, in response to determining that the data of the respective profile does not match the metadata of the media asset, the media guidance application determines (e.g., via control circuitry 504, as discussed with reference to FIGS. 3-6) that the respective user is not interested in the media asset.

At 712, the media guidance application identifies (e.g., via control circuitry 504, as discussed with reference to FIGS. 3-6) a first subset of the plurality of users that includes each respective user that is interested in the media asset. The media guidance application may create a data structure in storage 508 and store a list of pointers in the data structure such that each pointer is pointing to a user that is interested in the media asset.

At 714, the media guidance application identifies (e.g., via control circuitry 504, as discussed with reference to FIGS. 3-6) a second subset of the plurality of users that includes each respective user that is not interested in the media asset. The media guidance application may create a data structure in storage 508 and store a list of pointers in the data structure such that each pointer is pointing to a user that is not interested in the media asset.

At 716, the media guidance application detects (e.g., via control circuitry 504, as discussed with reference to FIGS. 3-6) that a user of the plurality of users is disregarding the media asset. Various methods of detection have been described above in relation to FIG. 1. At 718, the media guidance application determines (e.g., via control circuitry 504, as discussed with reference to FIGS. 3-6) whether the user is identified in the first subset or in the second subset. The media guidance application may make that determination by iterating through the data structure described in relation to step 712 and 714 and determining which data structure includes a pointer to a user's representation in memory.

At 720, in response to determining that the user is identified in the first subset, the media guidance application stores (e.g., via control circuitry 504 in storage 508, as discussed with reference to FIGS. 3-6) a portion of the media asset starting at a time when the user started disregarding the media asset. At 722, in response to determining that the user is in the second subset, the media guidance application refrains (e.g., via control circuitry 504, as discussed with reference to FIGS. 3-6) from storing the portion of the media asset starting at the time when the user started disregarding the media asset.

It is contemplated that the descriptions of FIG. 7 may be used with any other embodiment of this disclosure. In addition, the descriptions described in relation to the process of FIG. 7 may be done in alternative orders or in parallel to further the purposes of this disclosure. Furthermore, it should be noted that the process of FIG. 7 may be implemented on a combination of appropriately configured software and hardware, and that any of the devices or equipment discussed in relation to FIGS. 5-6 could be used to implement one or more portions of the process. Moreover, steps of process 700 may be used in conjunction with any step of process 800 and 900. Steps of process 700 may be omitted or replaced with any step of process 800 or 900.

Figure 8:
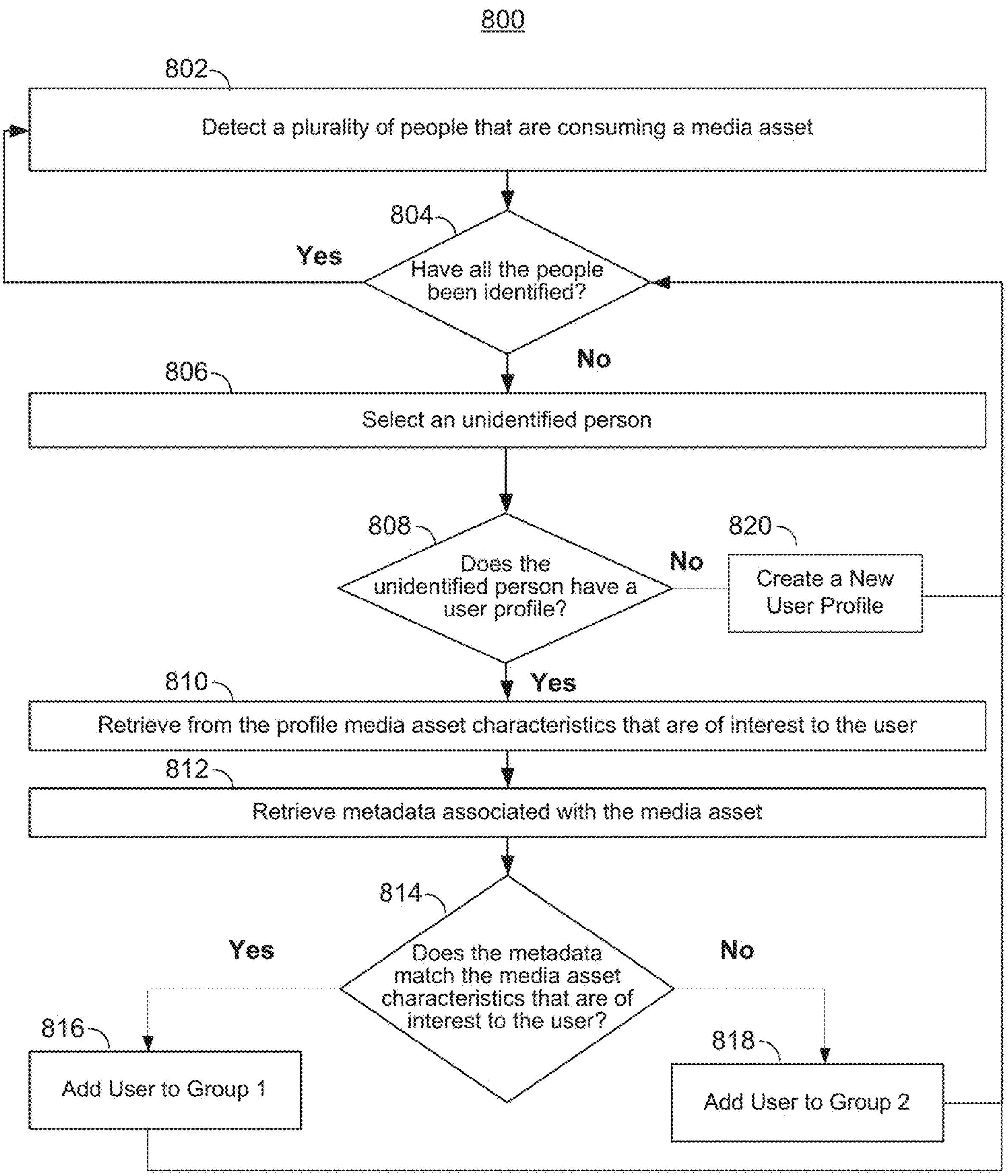
FIG. 8 depicts an illustrative process involved in determining which of a plurality of users are interested in a media asset being consumed and which are not, in accordance with some embodiments of this disclosure.

FIG. 8 depicts illustrative process 800 involved in determining which of a plurality of users are interested in a media asset being consumed and which are not. At 802, the media guidance application detects (e.g., via control circuitry 504, as discussed with reference to FIGS. 3-6) that a plurality of people are consuming a media asset. The media guidance application may perform the detection with any of the methods described in relation to FIG. 1. At 804, the media guidance application determines whether all people have been identified. If the media guidance application determines that all people have been identified, process 800 moves to 802 to continue scanning the room and determining if new people have been detected. As described above, in relation to FIG. 1, the media guidance application may use a camera to make the detection. If some people have not yet been identified, the media guidance application at 806, selects (e.g., via control circuitry 504) an unidentified person.

At 808, the media guidance application determines (e.g., via control circuitry 504, as discussed with reference to FIGS. 3-6) whether the unidentified user has an associated user profile. The media guidance application may make the determination by using face recognition algorithms to detect different users based on their facial features. For example, the media guidance application may use the camera to take a digital photograph of each user and send these files to a remote server where the photographs may be analyzed and compared to photos located in the users' profiles. When a match is found the correct us is identified and matched to the correct profile. Additionally or alternatively, this kind of identification may be done locally by the media guidance application. For example, the media guidance application may compare the photographs that have been taken of the users consuming the media asset with photographs located in user profiles local on the system. Those digital photographs that are not matched locally may be sent to a remote server for further processing. A remote server may have a broader range of profiles that are associated with users, for example.

If the unidentified user does not have an associated user profile, process 800 moves to step 820, where a new user profile is created for the user and a the digital photograph is stored in the profile. Upon creation of the new profile, process 800 moves to 804. If the media guidance application determines that the unidentified user has an associated user profile process 800 moves to step 810, where the media guidance application retrieves (e.g., via control circuitry 504), from the profile media asset characteristics that are of interest to the user. The media guidance application may retrieve, for example, a list of genres that the user prefers or a list show titles. At 812, the media guidance application retrieves (e.g., via control circuitry 504, as discussed with reference to FIGS. 3-6) metadata associated with the media asset. For example, the media guidance application may retrieve from storage 508 the metadata. Additionally or alternatively the media guidance application may retrieve the metadata from media content source 616 or media guidance data source 618.

At 814, the media guidance application determines (e.g., via control circuitry 504, as discussed with reference to FIGS. 3-6) whether the metadata matches the media asset characteristics that are of interest to the user. The media guidance application may perform a keyword comparison between the media asset characteristics and the words in the metadata of the media asset. If the media guidance application determines that the metadata matches the media asset characteristics that are of interested to the user, process 800 moves to 816 where the user is added to Group 1. If the media guidance application determines that the metadata does not match the media asset characteristics that are of interested to the user, process 800 moves to 818 where the user is added to Group 2. Thereafter, process 800 moves to step 804.

It is contemplated that the descriptions of FIG. 8 may be used with any other embodiment of this disclosure. In addition, the descriptions described in relation to the process of FIG. 8 may be done in alternative orders or in parallel to further the purposes of this disclosure. Furthermore, it should be noted that the process of FIG. 8 may be implemented on a combination of appropriately configured software and hardware, and that any of the devices or equipment discussed in relation to FIGS. 5-6 could be used to implement one or more portions of the process. Moreover, steps of process 800 may be used in conjunction with any step of process 700 and 900. Steps of process 800 may be omitted or replaced with any step of process 700 or 900.

Figure 9:
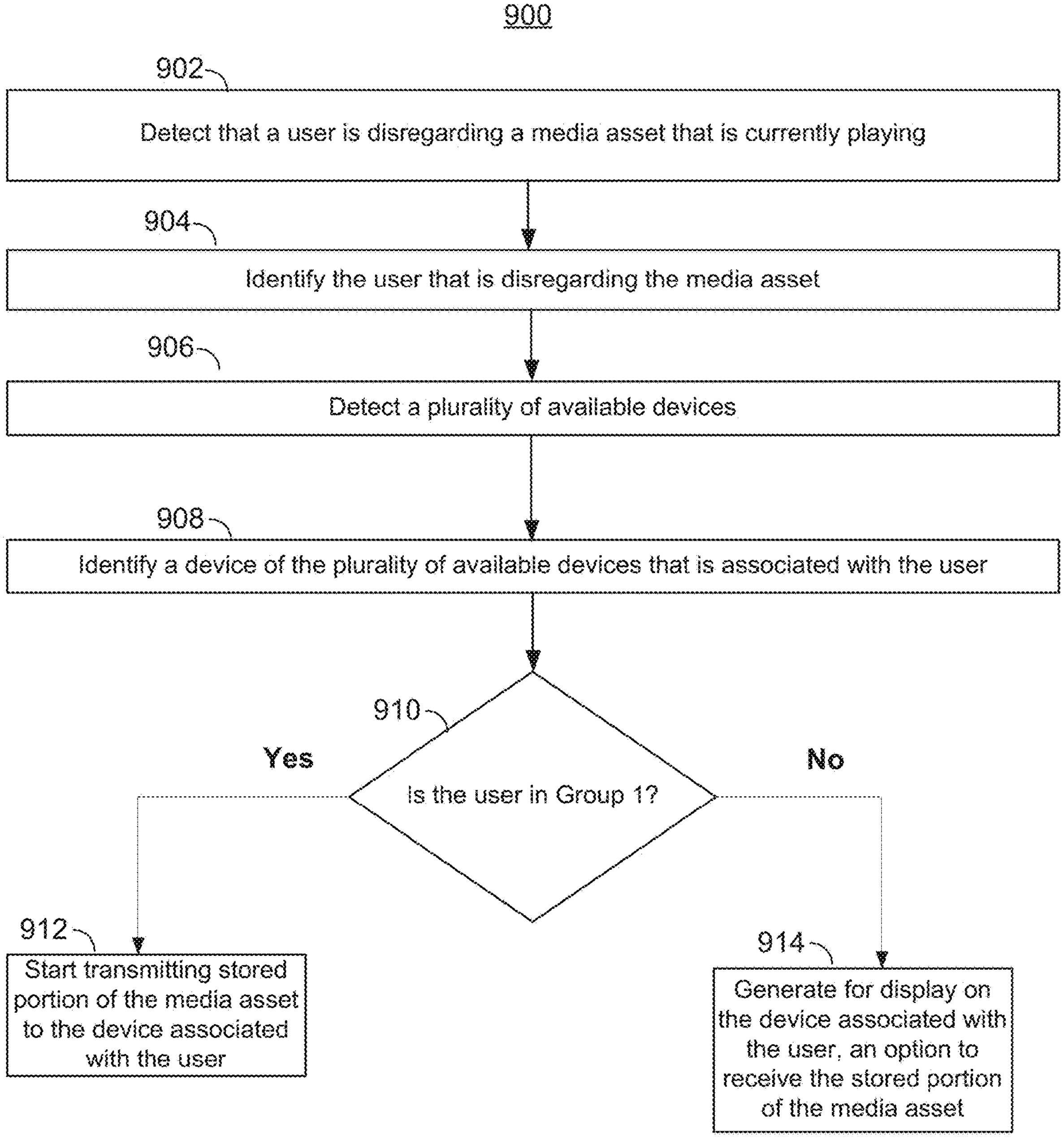
FIG. 9 depicts an illustrative process involved in starting transmission of the stored portion of the media asset to a device associated with the user who is disregarding the media asset, in accordance with some embodiments of this disclosure.

FIG. 9 depicts an illustrative process involved in starting transmission of the stored portion of the media asset to a device associated with the user that is disregarding the media asset. At 902, the media guidance application (e.g., via control circuitry 504, as discussed with reference to FIGS. 3-6) detects that a user is disregarding a media asset that is currently playing. Various methods of detecting that a user is disregarding the media asset have been described in relation to FIG. 1 and may be used at this step. At 904, the media guidance application, identifies (e.g., via control circuitry 504, as discussed with reference to FIGS. 3-6) the user that is disregarding the media asset. Methods of identifying users have been discussed in relation to FIG. 1 and FIG. 7. Any of those methods may be used at this step.

At 906, the media guidance application detects (e.g., via control circuitry 504) detects a plurality of available devices. Methods of detecting available devices have been described above. For example, the media guidance application may scan for wireless devices available on a Wi-Fi network or a Bluetooth network. At 908, the media guidance application identifies (e.g., via control circuitry 504, as discussed with reference to FIGS. 3-6) a device of the plurality of available devices that is associated with the user. As described above, the media guidance application may make the identification by comparing an identification of each available device with an identification of each device associated with the user's profile.

At 910, the media guidance application determines (e.g., via control circuitry 504, as discussed with reference to FIGS. 3-6) whether the user is in Group 1 or Group 2. The groups may have been formed as part of process 800 of FIG. 8. If the user is in group 1 (e.g., the group of users that are interested in the media asset), the media guidance application, at 912, starts transmitting (e.g., via control circuitry 504 through I/O path 502, as discussed with reference to FIGS. 3-6) the stored portion of the media asset to the device of the plurality of available devices that is associated with the user. If the user is not in Group 1, the media guidance application generates for display (e.g., via control circuitry 504, as discussed with reference to FIGS. 3-6) on the device associated with the user, an option to receive the stored portion of the media asset.

It is contemplated that the descriptions of FIG. 9 may be used with any other embodiment of this disclosure. In addition, the descriptions described in relation to the process of FIG. 9 may be done in alternative orders or in parallel to further the purposes of this disclosure. Furthermore, it should be noted that the process of FIG. 9 may be implemented on a combination of appropriately configured software and hardware, and that any of the devices or equipment discussed in relation to FIGS. 5-6 could be used to implement one or more portions of the process. Moreover, steps of process 900 may be used in conjunction with any step of process 700 and 800. Steps of process 900 may be omitted or replaced with any step of process 700 or 800.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:

detecting that at least one user of a plurality of users is disregarding a portion of a media asset that is currently playing, wherein the portion of the media asset is associated with metadata;

determining that the at least one user is not associated with a user profile;

generating a new user profile for the at least one user, the new user profile being associated with the at least one user and comprising metadata associated with media asset characteristics;

determining a plurality of interests of the at least one user based at least in part on the metadata associated with the media asset characteristics stored in the new user profile; and based at least in part on the plurality of interests:

adding the at least one user to (i) a first group of users of the plurality of users that is interested in and is disregarding the media asset or (ii) a second group of users of the plurality of users that is not interested in the media asset; and determining, based at least in part on the adding, an action to perform at one or more devices associated with the at least one user.

2. The method of claim 1, wherein the portion of the media asset is associated with an event, and wherein the detecting that the at least one user is disregarding the portion of the media asset comprises determining that the at least one user missed an occurrence of the event, the method further comprising:

determining that the at least one user is interested in the event based at least in part on the metadata associated with the media asset characteristics stored in the new user profile;

adding the at least one user to the first group of users that is interested in and is disregarding the media asset; and performing the action at the one or more devices associated with the at least one user, wherein the action comprises transmitting the portion of the media asset to the one or more devices.

3. The method of claim 1, wherein adding the at least one user comprises:

retrieving a subset of the media asset characteristics stored in the new user profile that are of interest to the at least one user;

retrieving the metadata associated with the portion of the media asset; and comparing the subset of the media asset characteristics that are of interest to the at least one user to the metadata associated with the portion of the media asset to determine whether a match exists.

4. The method of claim 3, further comprising:

based at least in part on determining that the match exists:

adding the at least one user to the first group of users that is interested in and is disregarding the media asset; and performing the action at the one or more devices associated with the at least one user, wherein the action comprises transmitting the portion of the media asset to the one or more devices.

5. The method of claim 3, further comprising:

based at least in part on determining that the match does not exist:

adding the at least one user to the second group of users that is not interested in the media asset; and performing the action at the one or more devices associated with the at least one user, wherein the action comprises refraining from automatically beginning to record the portion of the media asset.

6. The method of claim 2, wherein determining that the at least one user is not associated with the user profile comprises:

capturing an image of a face of the at least one user using a camera device;

comparing, using facial recognition techniques, the image of the face of the at least one user to a plurality of images respectively associated with a plurality of user profiles stored in a memory; and based at least in part on the comparing, determining that the image of the face of the at least one user does not match any image of the plurality of images respectively associated with the plurality of user profiles.

7. The method of claim 6, further comprising:

based at least in part on determining that the image of the face of the at least one user does not match any image of the plurality of images, transmitting the image of the face of the at least one user to a remote server to be analyzed.

8. The method of claim 1, further comprising:

receiving a request to play the portion of the media asset; and based at least in part on receiving the request, causing to be played the portion of the media asset at the one or more devices associated with the at least one user.

9. The method of claim 1, further comprising:

causing to be displayed, on the one or more devices associated with the at least one user, a prompt to schedule the portion of the media asset for recording, wherein the prompt comprises a selectable option to begin recording.

10. The method of claim 1, further comprising:

determining that the media asset is an audio-visual media asset;

determining that the portion of the media asset does not include dialogue; and based at least in part on determining that the portion of the media asset does not include the dialogue:

storing the portion of the media asset; and causing to be displayed video of the stored portion of the media asset at an increased speed.

11. A system comprising:

a memory;

an input/output (I/O) circuitry; and a control circuitry configured to:

detect that at least one user of a plurality of users is disregarding a portion of a media asset that is currently playing, wherein the portion of the media asset is associated with metadata;

determine that the at least one user is not associated with a user profile;

wherein the I/O circuitry is configured to:

generate a new user profile for the at least one user, the new user profile being associated with the at least one user and comprising metadata associated with media asset characteristics, wherein the new user profile is stored in the memory;

wherein the control circuitry is configured to:

determine a plurality of interests of the at least one user based at least in part on the metadata associated with the media asset characteristics stored in the new user profile; and based at least in part on the plurality of interests:

add the at least one user to (i) a first group of users of the plurality of users that is interested in and is disregarding the media asset or (ii) a second group of users of the plurality of users that is not interested in the media asset; and determine, based at least in part on the adding, an action to perform at one or more devices associated with the at least one user.

12. The system of claim 11, wherein the portion of the media asset is associated with an event, and wherein the control circuitry is configured to detect that the at least one user is disregarding the portion of the media asset by determining that the at least one user missed an occurrence of the event, wherein the control circuitry is further configured to:

determine that the at least one user is interested in the event based at least in part on the metadata associated with the media asset characteristics stored in the new user profile;

wherein the I/O circuitry is further configured to:

add the at least one user to the first group of users that is interested in and is disregarding the media asset; and perform the action at the one or more devices associated with the at least one user, wherein the action comprises transmitting the portion of the media asset to the one or more devices.

13. The system of claim 11, wherein the control circuitry is configured to add the at least one user by using the I/O circuitry to:

retrieve a subset of the media asset characteristics stored in the new user profile that are of interest to the at least one user;

retrieve the metadata associated with the portion of the media asset; and compare the subset of the media asset characteristics that are of interest to the at least one user to the metadata associated with the portion of the media asset to determine whether a match exists.

14. The system of claim 13, wherein the I/O circuitry is further configured to:

based at least in part on determining that the match exists:

add the at least one user to the first group of users that is interested in and is disregarding the media asset; and perform the action at the one or more devices associated with the at least one user, wherein the action comprises transmitting the portion of the media asset to the one or more devices.

15. The system of claim 13, wherein the I/O circuitry is further configured to:

based at least in part on determining that the match does not exist:

add the at least one user to the second group of users that is not interested in the media asset; and perform the action at the one or more devices associated with the at least one user, wherein the action comprises refraining from automatically beginning to record the portion of the media asset.

16. The system of claim 11, wherein the control circuitry is configured to determine that the at least one user is not associated with the user profile by:

capturing an image of a face of the at least one user using a camera device;

comparing, using facial recognition techniques, the image of the face of the at least one user to a plurality of images respectively associated with a plurality of user profiles stored in the memory; and based at least in part on the comparing, determining that the image of the face of the at least one user does not match any image of the plurality of images respectively associated with the plurality of user profiles.

17. The system of claim 16, wherein the I/O circuitry is further configured to:

based at least in part on determining that the image of the face of the at least one user does not match any image of the plurality of images, transmit the image of the face of the at least one user to a remote server to be analyzed.

18. The system of claim 11, wherein the I/O circuitry is further configured to:

receive a request to play the portion of the media asset; and based at least in part on receiving the request, cause to be played the portion of the media asset at the one or more devices associated with the at least one user.

19. The system of claim 11, wherein the I/O circuitry is further configured to:

cause to be displayed, on the one or more devices associated with the at least one user, a prompt to schedule the portion of the media asset for recording, wherein the prompt comprises a selectable option to begin recording.

20. The system of claim 11, wherein the control circuitry is further configured to:

determine that the media asset is an audio-visual media asset;

determine that the portion of the media asset does not include dialogue; and wherein the I/O circuitry is further configured to:

based at least in part on determining that the portion of the media asset does not include the dialogue:

store the portion of the media asset; and cause to be displayed video of the stored portion of the media asset at an increased speed.

* * * * *